United States Patent Office 3,076,719
Patented Feb. 5, 1963

---

3,076,719
TITANIUM DIOXIDE PIGMENT OF EASIER
DISPERSIBILITY
Walter R. Whately and Gerard M. Sheehan, Lynchburg, Va., assignors to American Cyanamid Company, New York, N.Y., a corporation of Maine
No Drawing. Filed Sept. 15, 1960, Ser. No. 56,112
10 Claims. (Cl. 106—300)

This is a continuation-in-part of our copending application Serial No. 776,706, filed November 28, 1958, now abandoned.

The present invention relates to dry titanium dioxide pigment of improved dispersibility in surface-coating composition vehicles, both when freshly prepared and after compaction and storage. The invention particularly relates to such pigment having the improved properties mentioned as the result of the presence thereon of a non-ionic normally water-soluble polyol.

Titanium dioxide is at present the premier white pigment of commerce. Practically all of this pigment is produced in centrally located plants and is delivered to customers in dry powder form. Generally the pigment is packaged in 50-lb. multi-wall paper bags which are shipped by truck or rail. The bags are warehoused before and after shipment for periods of time required by circumstances. Generally at least several weeks elapse between manufacture of the pigment and its utilization by the customer, so that prior to use the pigment is subjected to protracted warehousing. During warehousing and shipment the bags are stacked upon each other, so that the pigment is stored under substantial pressure.

The size of titanium dioxide pigment particles is maintained within a narrow range to ensure best optical and physical properties, and it has long been known that the particles contain high free surface energy which causes them to clump together when packaged and stored. Dispersion of such pigment to optimum extent in surface-coating vehicles consequently required expenditure of a substantial amount of off-setting energy, and in the past the addition of a suitable dispersing agent to the vehicle has been considered a practical necessity for the purpose. The vehicles referred to include linseed oil and other drying and non-drying oils, alkyd resins, alkylated amine-aldehyde resins, and water in the case of latex paints.

The discovery has now been made that dry titanium dioxide pigment carrying in adsorbed form a small amount of a normally water-soluble non-ionic polyol containing between about 4 and 10 carbon atoms, at least three of which are consecutive, is substantially improved as regards its dispersibility in surface-coating composition vehicles. The pigment is prepared by a process which broadly comprises uniformly contacting the particles with a small amount of the polyol. A substantial proportion of the polyol is strongly adsorbed by the particles.

Pigment prepared according to preferred embodiments of the present invention possesses the following advantages:

(1) The pigment is substantially improved as regards vehicle dispersibility. A decrease of more than 80% in the number of oversize aggregates has been frequently achieved, and the results in organic vehicles and water have been closely similar. The invention thus permits a substantial saving in power required for dispersion.

(2) The pigment exhibits greater tendency to dry flow. It is thus considerably easier to empty from the bags in which it is shipped.

(3) The pigment is substantially unaffected as regards its other principal physical properties. Oil absorption, color, gloss, opacity, specific electrical resistance and chalk resistance values remain substantially unchanged.

(4) The treating agent is highly resistant to removal when the pigment is contacted with water or organic solvents. The dispersibility characteristics of the pigment are thus permanent.

(5) The treating agent may be applied as an incident to the finishing procedure to which titanium dioxide pigment is normally subjected. The invention thus does not require subjecting the pigment to a separate finishing step.

The amount of treating agent carried by the pigment of the present invention is surprisingly small. The minimum effective amount has not yet been determined, but the evidence is that this minimum is about 0.01% of the dry weight of the pigment. At the other extreme, pigment carrying more than about 3% by weight of treating agent possesses closely similar properties to the properties possessed by pigment carrying somewhat less treating agent, so that the value of 3% is taken as the upper practical limit. In practice we find that the maximum improvement per increment of agent occurs within the range of about 0.1% to 1%, and this range is accordingly preferred.

Laboratory trials have shown that very satisfactory improvement in dispersibility occurs when the pigment particles carry between about 0.1% and 0.3% by weight of the polyol, and calculations indicate that this amount is less than that theoretically required to form a monomolecular layer of treating agent over the particles. The reason why such very small amount of treating agent produces such remarkable improvements is not known and we do not wish to be bound by any theory.

The titanium dioxide pigment benefited by the present invention includes the grades which contain small amounts of alkali metal and alkali earth metal salts as conditioning agents; the salts of other metals such as antimony, chromium and zinc as brighteners and rutile promotors; and the hydrous oxides of aluminum, titanium, zirconium, silicon and similar elements as agents improving the color and chalk resistant values of the pigment. The amount of these added salts and agents is normally very minor and usually less than 5% of the weight of the pigment. The invention is further usefully applied to titanium dioxide pigment containing extender material such as calcium sulfate, barium sulfate, lithopone, etc.

More in detail, pigment according to the present invention can be prepared according to a number of procedures. One convenient method is to meter the treating agent and the pigment into a fluid energy mill such as that disclosed in U.S. Patent No. 2,219,011 granted on October 22, 1940, to Kidwell et al. (wherein pigment particles are introduced as a jet into a stream of superheated steam moving at supersonic velocity, and are thus made to collide together with great force). With care it is possible to meter the small amount of treating agent uniformly into the stream of pigment as it enters the mill; the frequent violent collisions spread the agent over the surface of the particles. The majority of commercially available water-soluble polyols become at least plastic at the operating temperatures of mills driven by superheated steam.

In practice, we have found it more convenient to apply the polyol by the use of a solvent medium. According to this method the polyol is dissolved in a suitable solvent and the solution added to a slurry of titanium dioxide pigment. The slurry is then agitated until the treating agent is uniformly distributed, after which the pigment may be dried, upon which the polyol is at least in part adsorbed on the surface of the particles. The solvent may be an organic liquid or water, and because of its convenience the latter is preferred. The pigment may be in flocculated or deflocculated form during treatment. Commercially, we find it most convenient to add the polyol to the slurry resulting from the hydroclassification step to which pigment is subjected to remove oversize (+4 micron) particles.

The weight of polyol in the solution should be a predetermined excess over the amount desired to be deposited on the pigment. Typically 20%–40% of polyol remains in the aqueous or solvent phase or is lost during washing, and allowance should be made for this loss in calculating the amount added.

It is within the scope of the invention to apply the treating agent in emulsion form by spraying dewatered pigment slurry therewith. The treating agent may be applied in this manner while an aqueous suspension of titanium dioxide pigment is being dewatered on a continuous rotary vacuum drum filter, the emulsion being sprayed on the layer of cake on the drum while it is on the vacuum side.

The polyols employed as treating agents in the present invention are non-ionic and thus do not significantly alter the conductivity characteristics of the pigment. They are water-soluble resulting from the presence therein of a high proportion of hydroxyl groups. There may thus be employed to advantage the various sugars (aldoses and ketoses) containing a sufficient proportion of hydroxy groups to render them water-soluble and levulose and dextrose can be successfully employed for this purpose. We prefer, however, the fully reduced sugar alcohols. These contain one hydroxyl group for every carbon atom in the molecule and have the particular advantage that they are thermostable. The pigment may thus be dried in the range of 100°–150° C. as is customary and low temperature drying need not be employed. The invention includes, however, polyols wherein at least half of the carbon atoms carry one hydroxyl group each.

Among the polyols suitable for the purpose of the present invention are mannitol, sorbitol, fructose, dextrose, levulose, pentaerythritol, anhydroenneaheptitol, and invert sugar (α-D-glucopyranose +β-D-fructo-furanose, 1:1 molar ratio).

Best results appear to be obtained by use of polyols wherein the non-quarternary carbon atoms carry one hydroxyl group each, so that the molecule as a whole possesses strong hydrophilic properties. The term "quarternary" designates carbon atoms all four valences of which are attached directly to carbon, as is the case with pentaerythritol.

As stated, polyols suitable for use in the present invention contain at least 4 and not in excess of about 10 carbon atoms. Laboratory trials have shown that the improvement in dispersibility effected by polyols of fewer than four carbon atoms is fugitive, probably because of the low molecular weight of the polyol, which either permits the polyol to volatilize comparatively rapidly or to migrate away from the surface of the pigment. Pigment carrying polyols of more than about 10 carbon atoms act as emulsifying agents which accelerate the breakdown of lithographic inks by fountain solutions. The dispersibility of titanium dioxide pigment particles carrying a polyol of 4 to 10 carbon atoms in surface-coating vehicles is accordingly substantially and comparatively permanently improved, and this is the case whether the vehicle is aqueous (as in the case of kalsomine or latex emulsions) or organic (as in the case of paints, enamels and lacquers).

Our parent applilcation specified that the polyol be humectant or hygroscopic. We have now found that this property is not necessary.

The invention will be further described by the examples which follow. These examples represent specific embodiments of the invention and are not to be construed as limitations thereon.

*Example 1*

The following illustrates the manufacture of pigment of improved dispersibility in surface-coating vehicles according to one process of the present invention, particularly showing the effect of proportions.

In each instance a 40% by weight pigment slurry was prepared, and the amount of treating agent shown in the table below was added in solution form, after which the slurries were intensively agitated at 55° C. for one hour to ensure thorough uniform mixing, so that the treating agents were uniformly distributed through the pigment slurries.

The slurries were sucked apparently dry on a Büchner funnel. The cakes (containing approximately 50% solids) were dried in an oven at 110° C. and the resulting dry pigments uniformly containing the treating agents were disintegrated in a laboratory 2″ jet mill. Control pigment samples were prepared in the same way except that addition of treating agent was omitted.

The dispersibility of the resulting pigment samples in surface-coating vehicles was determined by intensively mixing 250 gm. of the pigment and 182 ml. of a 0.1% solution of tetrasodium pyrophosphate for four minutes using a laboratory "Lightnin'" mixer, pouring the resulting slurry upon a 60-mesh screen, washing the slurry fines through the screen by means of a light spray of water, removing the screen oversize fraction, weighing the oversize fraction after drying, and reporting the weight of the oversize fraction as a percentage of the pigment screened. Experience has shown that when the treating agent is a polyol containing 4 to 10 carbon atoms, this test is a practical index of the dispersibility of the pigment not merely in aqueous media but in organic paint, lacquer and enamel vehicles as well.

Results were as follows.

| Run No. | Pigment [1] | Treating Agent Added [2]—Name | Percent [3] | Screen Oversize, Percent [3] |
|---|---|---|---|---|
| Control A: | Anatase | None | | 5.0 |
| 1 | ---do--- | Pentaerythritol | 0.1 | 0.08 |
| 2 | ---do--- | ---do--- | 0.5 | 0.01 |
| Control B: | Rutile, 2% Al$_2$O$_3$ [4] | None | | 0.24 |
| 1 | ---do.[4] | Pentaerythritol | 0.25 | 0.09 |
| 2 | ---do.[4] | ---do--- | 0.33 | 0.04 |
| 3 | ---do.[4] | ---do--- | 0.5 | 0.02 |
| 4 | ---do.[4] | ---do--- | 1.0 | 0.02 |
| Control C: | ---do.[4] | None | | 0.24 |
| 1 | ---do.[4] | 2-Methyl-1,2,3-propanetriol | 0.5 | 0.02 |
| 2 | ---do.[4] | ---do--- | 1.0 | 0.04 |
| Control D: | ---do.[4] | None | | 0.24 |
| 1 | ---do.[4] | Sorbitol | 0.5 | 0.07 |
| 2 | ---do.[4] | ---do--- | 1.0 | 0.06 |
| Control E: | Rutile, 1% Al$_2$O$_3$ [4] | None | | 4.6 |
| 1 | ---do.[4] | Pentaerythritol | 0.5 | 0.18 |

[1] Pigment was washed before use to remove any soluble salts present.
[2] To slurry.
[3] Based on dry weight of pigment.
[4] Prepared by slurrying untreated TiO$_2$ in aqueous alum solution and raising the pH to 7.3.

Samples of the above pigments which contained treating agents were extracted with boiling water for two hours in a Soxhlet extractor. On evaporation of the extracts it was found in each instance that less than one-third of the treating agent had been removed showing that the treating agents were at least in part adsorbed.

*Example 2*

The following illustrates the direct application of treating agent to the pigment by use of a jet mill.

A charge of 1,000 gm. of rutile TiO$_2$ pigment containing 1% of hydrous alumina calculated as Al$_2$O$_3$ was dry blended with 10 gm. of pentaerythritol, screened through a 60-mesh screen and the charge passed through a 2″ laboratory jet mill driven by steam superheated to 400° F. The procedure was repeated with the amount of pentaerythritol decreased to 5 gm.

The dispersibility of the pigment was determined by the method of Example 1 with results as follows:

| Run No. | Percent Pentaerythritol Added | Screen Oversize,[1] Percent |
|---|---|---|
| Control | None | 4.0 |
| 1 | 0.1 | 0.2 |
| 2 | 0.5 | 0.1 |

[1] Based on weight of pigment.

*Example 3*

The following illustrates the effect of the present invention on improving the dispersibility of titanium dioxide pigment before and after compaction and storage.

The pigment employed was commercial titanium dioxide pigment containing 1% by weight of hydrous alumina (calculated as $Al_2O_3$) and was divided into two parts.

One part was treated with 0.5% of pentaerythritol and jet-milled by the method of Example 1. The second part was treated in the same manner except that addition of the pentaerythritol was omitted. Both parts were bagged in a 50-lb. multiwall paper bag, compacted in a hydraulic pallet press to 90% of volume, and stored for 30 days. The water dispersibility of both samples was determined initially (before compaction) and at the end of the 30-day period.

Results are as follows.

| No. | Pentaerythritol Applied, Percent | Storage, Days | Screen Oversize,[1] Percent |
|---|---|---|---|
| 1 | None | 0 | 2 |
| 2 | None | 30 | 18 |
| 3 | 0.3 | 0 | 0.05 |
| 4 | 0.5 | 30 | 0.10 |

[1] Based on weight of pigment.

We claim:
1. Dry titanium dioxide pigment particles of improved dispersibility in surface-coating vehicles including water, uniformly carrying between about 0.01% and 3% by weight of a non-ionic normally water-soluble polyol containing between about 4 and 10 carbon atoms, at least three of which are consecutive, said polyol being at least in part adsorbed on said pigment.

2. Particles according to claim 1 wherein the weight of polyol is between 0.1% and 1% of the weight of the pigment.

3. Particles according to claim 1 wherein at least half of the non-quaternary carbon atoms of the polyol carry one hydroxyl group each.

4. Particles according to claim 1 wherein the polyol is pentaerythritol.

5. Process for improving the dispersibility of dry titanium dioxide particles in surface-coating composition vehicles which comprises uniformly depositing on said pigment from water solution between about 0.01% and 3% of the dry weight of said pigment of a water-soluble non-ionic polyol containing between about 4 and 10 carbon atoms, at least three of which are consecutive, whereby at least part of said polyol is adsorbed on said pigment, and drying said pigment.

6. Process according to claim 5 wherein the pigment is freshly ground.

7. Process for improving the dispersibility of dry titanium dioxide pigment particles in surface-coating composition vehicles including water which comprises slurrying said particles with an aqueous solution of a non-ionic polyol containing between about 4 and 10 carbon atoms and drying said slurry, the amount of polyol in said solution being predetermined so that the pigment when dry carries between about 0.1% and 1% of its weight of said polyol, whereby at least part of said polyol is adsorbed on said pigment.

8. Process according to claim 7 wherein the weight of the particles is about equal to the weight of the polyol solution.

9. Process according to claim 7 wherein the slurry is dried at a temperature in excess of the melting point of the polyol.

10. Process for improving the dispersibility of freshly-ground dry titanium dioxide pigment particles in surface-coating composition vehicles including water which comprises mixing said pigment with 1/10% to 1% of its weight of a non-ionic normally water-soluble polyol containing between about 4 and 10 carbon atoms at least three of which are consecutive, and milling the resulting mixture in a stream of superheated steam moving at supersonic velocity.

References Cited in the file of this patent

UNITED STATES PATENTS

| 2,809,122 | Willis et al. | Oct. 8, 1957 |
| 2,844,486 | Lamarr | July 22, 1958 |
| 2,875,077 | McLellan | Feb. 24, 1959 |
| 2,882,177 | Newton et al. | Apr. 14, 1959 |
| 2,902,385 | Raab et al. | Sept. 1, 1959 |
| 2,907,670 | Katz et al. | Oct. 6, 1959 |
| 2,927,863 | Marotta et al. | Mar. 8, 1960 |
| 3,004,858 | Sheehan et al. | Oct. 17, 1961 |